United States Patent [19]

Sucov et al.

[11] 3,936,772

[45] Feb. 3, 1976

[54] HIGH FLOW METAL HALIDE VAPOR LASER

[75] Inventors: Eugene W. Sucov; Lelland A. C. Weaver, both of Pittsburgh, Pa.

[73] Assignee: Westinghouse Electric Corporation, Pittsburgh, Pa.

[22] Filed: Oct. 4, 1974

[21] Appl. No.: 511,966

Related U.S. Application Data

[63] Continuation of Ser. No. 339,670, March 9, 1973, abandoned.

[52] U.S. Cl......... 331/94.5 G; 331/94.5 PE; 330/4.3
[51] Int. Cl.² ........................................... H01S 3/22
[58] Field of Search..................... 331/94.5; 330/4.3

[56] References Cited
UNITED STATES PATENTS
3,576,500  4/1971  Gould et al. ................... 331/94.5

OTHER PUBLICATIONS

Seguin et al., *Applied Optics*, Vol. 11, No. 4, Apr. 1972, pp. 745–748.

McMahon, *Optical Spectra*, Vol. 5, Dec. 1971, pp. 30–34.

Russell et al., *Applied Physics Letters*, Vol. 21, pp. 565–567.

*Primary Examiner*—Robert J. Webster
*Attorney, Agent, or Firm*—D. Schron

[57] ABSTRACT

A method and means are disclosed for obtaining high pulse rate metal vapor laser transitions by vaporizing a metal halide of the desired metal. The vapor of the metal halide is transversely passed at at least sonic velocities through a discharge region where it is dissociated to provide a neutral metal atom excited to an upper laser level by electrons of sufficient energy to create resonance radiation trapping and a population inversion of the upper laser level. The flow rate is maintained to permit the excited metal atom to emit laser radiation by stimulated emission to a lower laser level in the discharge region and to remove the lower laser level atoms therefrom. Dissociation and excitation of the flowing metal atoms are repeated periodically.

12 Claims, 2 Drawing Figures

HIGH FLOW METAL HALIDE VAPOR LASER

This is a continuation of application Ser. No. 339,670 filed Mar. 9, 1973, now abandoned.

FIELD OF THE INVENTION

The present invention relates to a means and method for obtaining increased efficiency and high output power from metal vapor lasers and, in particular, to a high flow rate metal halide vapor laser.

BACKGROUND OF THE INVENTION

It is well known that metal vapors are particularly useful for stimulated emission of certain desired wave lengths. Many metal vapor laser transitions are well known, including copper at 5106 a, lead at 7229 A, and manganese at 5341 A and 12899 A. Of the metal vapors, copper is considered one of the most desirable because of high efficiency, peak power, and optical gain. Presently, metal vapor lasers require very high temperatures (1000°C to 1600°C) to generate sufficient vapor pressure to reach laser threshold conditions. Additionally, the laser pulse in metal vapor lasers is limited in duration by the time required to destroy the population inversion by filling of the lower laser level due to stimulated transitions. That is, if the rate of removal of lower laser level atoms is much slower than the pump rate or laser transition rate, the population of the lower level will build up, destroy the population inversion, and choke off the laser oscillations before the pumping pulse is complete. This self-limiting operation is common to most metal vapor lasers and, consequently, limits the efficiency and output power obtainable therefrom.

Various attempts have been made to overcome the self-terminating action of the metal vapor laser. One approach was to introduce an impurity such as a molecular gas in the belief that it would collisionally de-excite the lower laser level. While this was successful in molecular lasers such as $CO_2$, it did not prove successful in atomic vapor lasers. Another attempt was to sharpen the leading edge of the pumping pulse so as to increase the pumping rate into the upper level. This proposal was to increase the peak power in the pulse, but not its duration. While the method is generally successful, the amount by which the rise time of high current pulses can be lowered is limited.

Accordingly, it is an object of the present invention to provide a method and means for depopulating the lower laser level while maintaining sufficient population in the ground state to effect resonance trapping of radiation leakage from the upper level to the ground state.

SUMMARY OF THE INVENTION

The present invention utilizes a method disclosed in United States application Ser. No. 339,697, filed Mar. 9, 1973, entitled "Metal Halide Vapor Lasers" and assigned to the assignee of the present invention. Therein, it was found that laser transitions of desired metal vapors could be obtained at substantially lower temperatures by means of a halide of the desired metal. It was found that above certain threshold conditions sufficient metal atoms could be excited to upper laser levels and emit the desired radiation wavelength.

It was found, however, that during the laser process the lower laser level became filled because of inadequate de-excitation of the metastable state to the ground state, in a manner similar to a pure metal vapor laser. Since the lower energy level cannot radiate to the ground state, in the case of copper, in the electric dipole mode, the de-excitation is through collision with container walls. The time required for diffusion of the metastable metal atom is primarily the mean diffusion time of the metal atom in the laser mixture, that is, it is related to particle densities and discharge tube dimensions. In the copper vapor laser, for example, the diffusion time is about $10^{-3}$ seconds, whereas the stimulated emission rate into the lower metastable laser level is less than about 100 nsec. Consequently, the lower laser level effectively limits the lasing process, terminating the laser pulse when population inversion approaches zero. This results in a very short duration laser pulse of from 16 to 20 nsec. Thus, before another laser pulse can be extracted, the lower laser level must be empty, requiring about 1 millisecond. The maximum pulse repetition rate, therefore, is about 1 kHz, although rates up to 18 kHz may be obtained with some sacrifice in the available laser efficiency. Also, as the vapor pressure increases and/or the discharge tube dimensions become larger, diffusion times are increased and repetition rates lowered. Moreover, all energy injected after the 20 nsec laser pulse time is wasted.

The method of the present invention provides for vapor transition through the laser region at a rate faster than the diffusion time of the metastable state; that is, the method requires circulating the vapors at sonic or supersonic velocities. The method of the present invention is rendered practical because the vapor temperatures of metal halides required for both resonance trapping threshold and vapor pressure threshold are substantially below those necessary to provide the density requirements in pure metal lasers.

The advantages of the present invention will become apparent from a perusal of the following detailed description taken in connection with the accompanying drawings.

DESCRIPTION OF THE PRESENTLY PREFERRED EMBODIMENT

Figure 1:
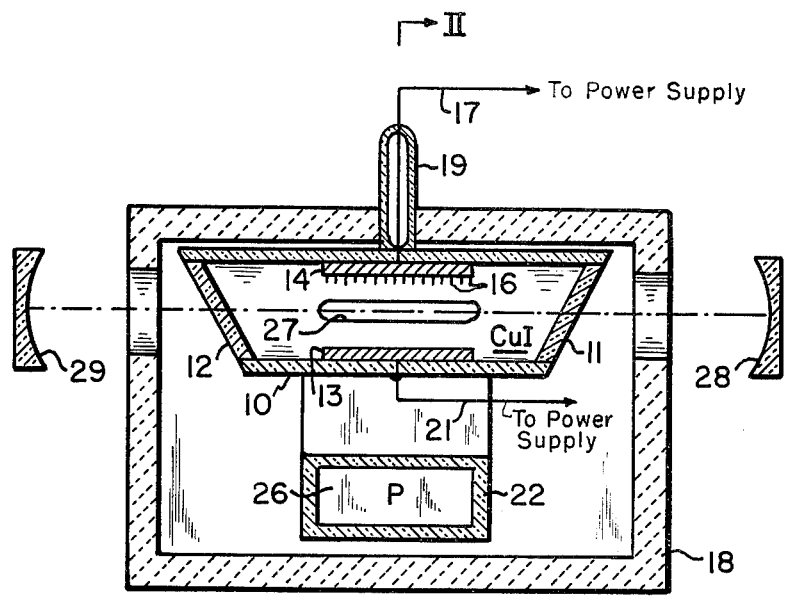
FIG. 1 is a cross-sectional view of a copper iodide discharge tube.
Figure 2:
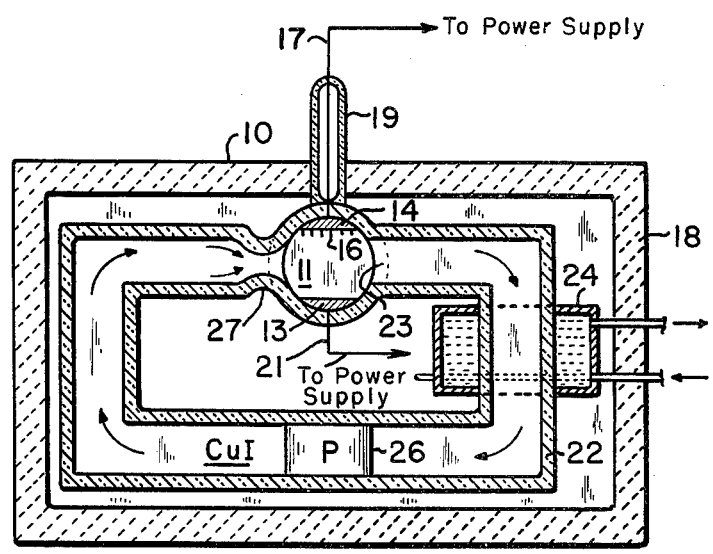
FIG. 2 is a side elevation of a laser discharge tube of the present invention.

Referring to FIGS. 1 and 2, a discharge tube 10 is shown which is preferably made from quartz, alumina, a refractory metal or the like. Discharge tube 10 includes a pair of Brewster angle windows 11 and 12 located at either end of said discharge tube, respectively. Positioned within discharge tube 10 and along the optical axis thereof are a pair of electrodes 13 and 14. Electrode 14 preferably includes a plurality of pin-like projections 16 extending toward the optical axis of discharge tube 10. Both electrodes 13 and 14 as well as the pin-like projections 16 are preferably made of molybdenum. Electrode 14 is connected to a power supply source, not shown, by means of line 17. In the presently shown configuration, discharge tube 10 is positioned within an electrical resistance oven 18. Because the discharge tube is located within an oven, lead 17 must pass through both a hot and cold region. It has been found that the lead when exposed to both the heat of an oven and air tends to oxidize and crack the quartz seals on the discharge tube. Accordingly, it is preferred to enclose lead 17 in a vacuum sheath 19 as it passes through the boundary between the hot and cold regions. A similar sheath may be provided about lead 21 which connects electrode 13 to the power supply depending upon the region through which lead 21 passes. As shown, lead 21 does not require a sheath.

Discharge tube 10 includes a closed loop 22 to provide a transverse flow across the optical axis of discharge tube 10. Loop 22 comprises an inlet opening 23 and a heat exchanger 24. Heat exchanger 24 may comprise a honeycomb structure having a cooling agent such as liquid sodium passing therethrough to cool vapors comprising metal halides, halogen, and metal atoms. The mixture of vapor after passing through heat exchanger 24 passes through pump 26, which is preferably a nonmechanical pump such as a magnetohydrodynamic pump. The vaporous mixture is thereafter injected transversely to discharge tube 10 through supersonic nozzle 27. The gaseous mixture as it passes from supersonic nozzle 27 to inlet opening 23 is subjected to energetic electrons provided by electrodes 13 and 14. It is also clear that a means other than closed loop 22 can be utilized to create a transverse flow.

Also included are a pair of mirrors 28 and 29 located along the optical axis for resonating the stimulated emission. Mirror 28 is preferably 100% reflective at the desired wavelength, whereas mirror 29 is approximately 90% reflective at that wavelength. Accordingly, laser output light is transmitted through mirror 29 to external optical elements, not shown.

Oven 18 is provided to maintain discharge tube 10 and loop 22 at a temperature of not less than about 675° for copper iodide. The coldest region is preferably maintained at the discharge end of nozzle 27.

In operation, it has been found that a condition inherently present in pure metal vapor lasers having sufficient metal vapor density but not present in the metal halide system of the same density is resonance radiation trapping. Resonance radiation trapping occurs when the ground state atomic density is sufficiently large to absorb most of the resonance radiation transmissions of the atoms which terminate on the ground state, thereby substantially preventing such radiation from escaping from the discharge region. The reabsorbed radiation increases the effective radiative lifetime of the atomic levels from which it originates. Notwithstanding the fact that metal halides were found to be selectively dissociated and to possess proper optical characteristics, lasing is not practical unless the resonance trapping threshold level is achieved. It has been found that rapid leakage of resonance radiation from the upper state to the ground state occurs notwithstanding satisfactory electrical discharges. With copper iodide, for example, at a temperature of less than 350°C corresponding to a ground state densitydischarge tube radius (R = 1.3 cm) product of $1.3 \times 10^{13}$ cm$^2$ or a dissociation level of about 0.001%, the upper laser energy level lifetime is about 10 nsec. Accordingly, to obtain a population inversion at that temperature and/or dissociation level it is necessary to have a current risetime substantially less than 10 nsec. Alternatively, by increasing the temperature above 350°C or a dissociation level greater than $10^{-3}$%, a substantially increased upper laser lifetime can be achieved, for example, 617 nsec. Accordingly, it is preferable to operate with copper halide, for example, in a temperature range above 350°C and preferably around 585° to 675°C to obtain sufficient copper halide vapor density for a higher absolute dissociation.

To obtain levels of dissociation above the minimum preferred levels as well as excitation into the upper laser levels, it is preferred that the current density of the discharge between electrodes 13 and 14 be approximately 50 to 500 amperes cm$^{-2}$ and preferably about 100 amperes cm$^{-2}$ for CuI. Also, a discharge current risetime of about 50 nsec, and, preferably, 20 to 30 nsec, is satisfactory to provide population inversion. It is also possible to provide independent control over the electrical discharge characteristics by utilizing a buffer gas in an amount of from between 1 to 50 torr and preferably between 5 to 10 torr. Suitable buffer gases include helium, argon, neon, nitrogen and the like. The electrical energy that must be injected to produce electrons by ionization to establish the population inversion is by selective electronic excitation. Since the mean electron energy is approximately greater than 2 eV and preferably greater than 4 eV to excite the upper level in copper, it has been found that an energy of from about 5 to 10 eV is adequate for selective excitation of the upper level. Thus, the addition of a buffer gas, e.g. helium, to the discharge is beneficial, since the excess of the high ionization potential of the gas, approximately 24.6 eV, tends to increase the average electron energy. The buffer gas partial pressure and the applied electric field should, therefore, be adjusted to maintain a mean electron energy of greater than 5 eV. Higher electron energy, however, may be used without diminishing the effectiveness of the selective excitation of the electron production.

By maintaining resonance radiation trapping conditions by utilization of higher dissociation levels and/or temperature as set forth above, the upper laser level lifetime can be increased and practical laser operation achieved. However, the lower laser level lifetime is a limiting factor to obtaining a high pulse rate because the forbidden transition or partially forbidden transition between the lower level and ground state creates a bottleneck. Accordingly, it is desirable to increase the rate of removal of lower laser level atoms to the ground state at a rate higher than typical diffusion rates, e.g. $10^{-3}$ sec. This is achieved by the sonic or supersonic transverse flow of the vaporized medium from nozzle 27 across the optical axis of discharge tube 10. For an output power of 100 watts at 5106 A, this would correspond to a mass flow rate of 0.01 lbs. sec.$^{-1}$. Assuming sonic velocities at 1 torr and a temperature of 500°C, a cross-sectional area of 47.6 cm$^2$ would be required for the transverse flow. If the metal halide, for example, is copper chloride, with no buffer gas, at a temperature of 500°C and a gas pressure of 1 torr, the laser production rate would be 10 kw/lb. sec.$^{-1}$. A flow velocity of approximately $3 \times 10^4$ cm per second or greater would be required for a discharge tube dimension of 20 cm by 2.35 cm. With an output power of approximately 100 watts, and a thermal efficiency of 5%, an electrical input power of 2 kilowatts is required. A pump capacity of 3000 cfm and a heat exchange capacity of 2 kilowatts are required.

Thus, because of the low temperatures required for metal halide, e.g. copper iodide at 675°C, compared to the high temperatures for the pure metal, e.g. copper at > 1200°C, a practical flow laser can be made and operated.

While presently preferred embodiments of the invention have been shown and described in particularity, it may otherwise be embodied within the scope of the appended claims.

What is claimed is:

1. A method for obtaining pulsed metal vapor laser transitions at temperatures substantially below the metal vaporization temperature, said method comprising:
   A. placing a metal halide of the desired metal within an enclosure;
   B. vaporizing said metal halide by heating said metal halide to a temperature not substantially in excess of that required to provide a high molecular vapor pressure and transversely flowing said vapors at at least sonic velocities across a discharge region;
   C. maintaining a temperature not substantially greater than said vaporization temperature, said temperature level being such as to prevent substantial thermal dissociation of said metal halide, and, at said temperature
      i. collisionally dissociating the metal halide vapor with energized electrons to provide ground state metal atoms of sufficient number density to create resonance radiation trapping, and substantially simultaneously therewith
      ii. creating a population inversion between a desired upper laser level and lower laser level of said metal by exciting ground state metal atoms with energized electrons and maintaining a sufficient number of metal atoms in the ground state to preserve said resonance radiation trapping, said energized electrons of steps (i) and (ii) being produced by ionization and having a mean electron energy of at least that required to excite the upper laser level of said metal atom;
   D. maintaining said flow velocity to permit said excited metal atoms to remit laser radiation by stimulated emission to a lower laser level within said discharge region and to remove said lower laser level atoms from said discharge region;
   E. resonating said stimulated emission; and
   F. repeating steps C, D, E and F.

2. A method as set forth in claim 1 wherein collisional dissociation and excitation are achieved by a current density discharge of about 50 to 500 amperes $cm^{-2}$.

3. A method as set forth in claim 1 wherein a buffer gas is added to said enclosure.

4. A method as set forth in claim 2 wherein said current density discharge is about 100 amperes $cm^{-2}$.

5. A method as set forth in claim 1 wherein in said metal halide is a copper halide selected from the group consisting of copper bromide, copper iodide, and copper chloride.

6. A method as set forth in claim 1 wherein said electron energy is at least 2 eV.

7. A method as set forth in claim 1 wherein said vapors are caused to flow in a closed loop after removal from said discharge region for reintroduction into said discharge region.

8. A method as set forth in claim 7 wherein said vapors are cooled during said closed loop flow.

9. A laser apparatus for obtaining pulsed metal vapor laser transitions at temperatures substantially below the metal vaporization temperature, said apparatus comprising:
   A. An enclosure;
   B. A metal halide of the desired metal within said enclosure;
   C. Means for vaporizing said metal halide by heating said metal halide to a temperature not substantially in excess of that required to provide a high molecular vapor pressure and for transversely flowing said vapors at at least sonic velocities across a discharge region;
   D. Means for maintaining a temperature not substantially greater than said vaporization temperature said maintained temperature being such as to prevent substantial thermal dissociation of said metal halide;
   E. Means for collisionally dissociating, at said maintained temperature, the metal halide vapor with energized electrons for providing ground state metal atoms of sufficient number density to create resonance radiation trapping;
   F. Means for creating a population inversion between a desired upper laser level and lower laser level of said metal by exciting ground state metal atoms with energized electrons and for maintaining a sufficient number of metal atoms in the ground state to preserve said resonance radiation trapping, substantially simultaneously with said collisional dissociation, said energized electrons havong a mean electron energy of at least that required to excite the upper laser level of said metal atom;
   G. Means for maintaining said flow velocity to permit said excited metal atoms to remit laser radiation by stimulated emission to a lower laser level within said discharge region and to remove said lower level atoms from said discharge region;
   H. Means for stimulating the emission of a beam of radiation from said inverted medium.

10. A laser as set forth in claim 9 wherein said enclosure is in the form of a closed loop having an inlet opening and a discharge nozzle, said inlet and nozzle being in communication with said discharge region.

11. An apparatus as set forth in claim 10 wherein said closed loop includes a means for cooling metal halide vapor and a means for pumping said vapor.

12. An apparatus as set forth in claim 10 wherein said discharge nozzle is a sonic nozzle.

* * * * *